United States Patent Office 2,693,466
Patented Nov. 2, 1954

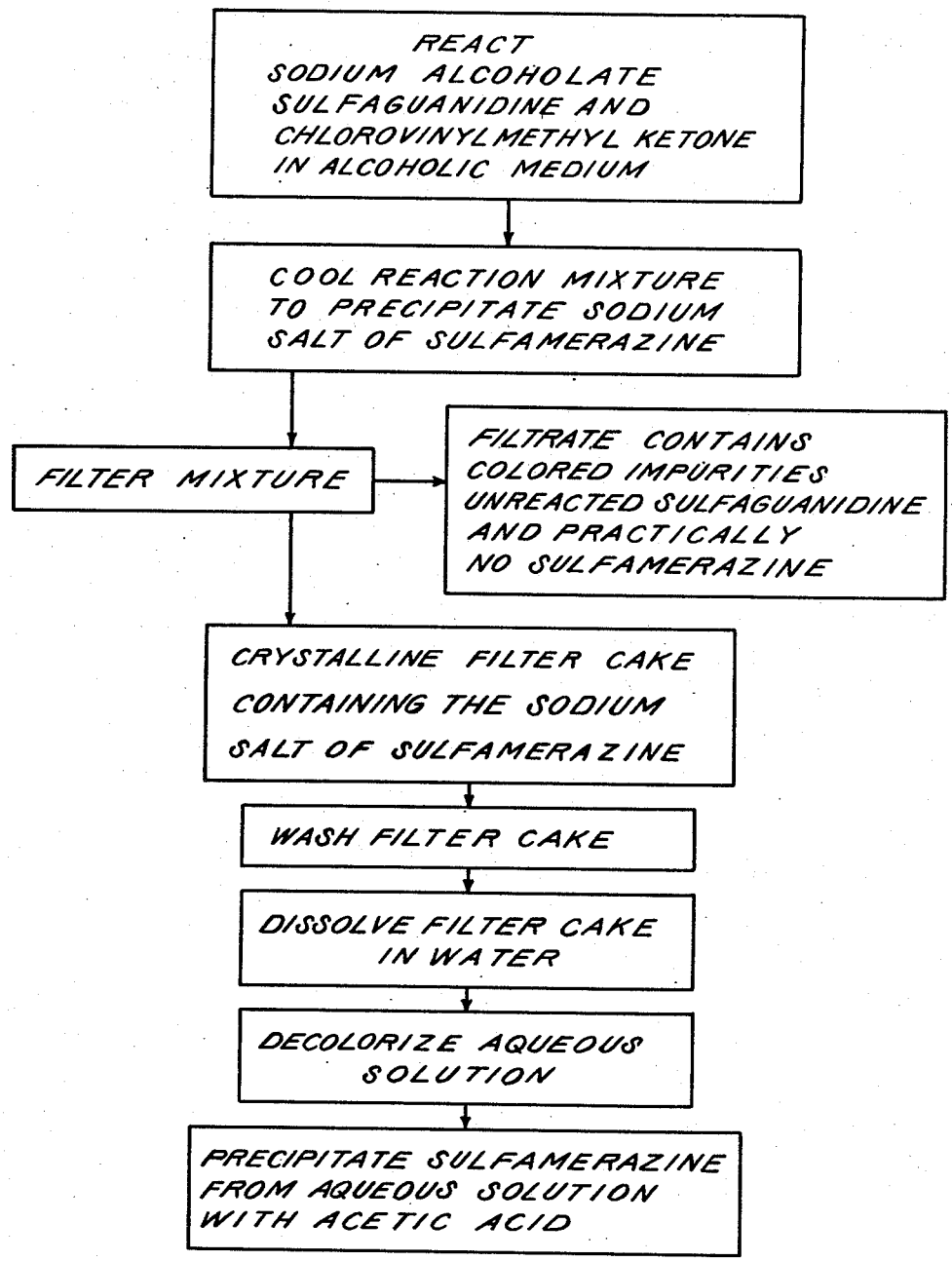

2,693,466

PRODUCTION OF PURIFIED SULFAMERAZINE

Taylor H. Evans and Ralph W. Mills, Guelph, Ontario, Canada, assignors to United States Rubber Company, New York, N. Y., a corporation of New Jersey Application August 6, 1952, Serial No. 302,944

1 Claim. (Cl. 260—239.75)

This invention relates to the manufacture of the therapeutic agent sulfamerazine, and more particularly it relates to an improved method of recovering sulfamerazine from the reaction mixture in which it is formed.

Sulfamerazine (i. e., 2-sulfanilamido-4-methylpyrimidine) may be produced by reacting sulfaguanidine (i. e., sulfanilylguanidine) with a ring-forming reactant such as chlorovinylmethyl ketone to form a pyrimidine ring, with the aid of a suitable reagent such as sodium ethylate, conveniently in an alcoholic medium, according to the following equation:

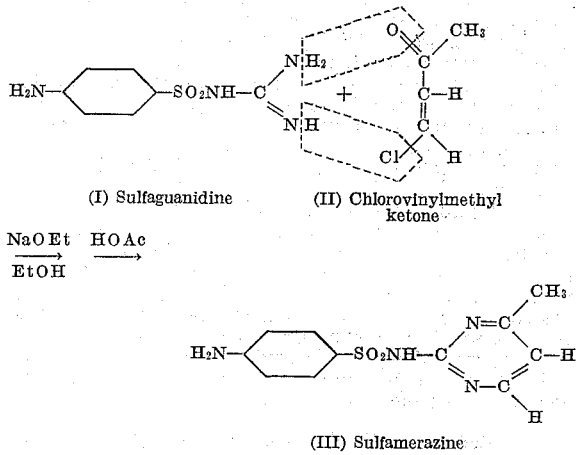

(I) Sulfaguanidine  (II) Chlorovinylmethyl ketone $$\xrightarrow[\text{EtOH}]{\text{NaOEt}} \xrightarrow{\text{HOAc}}$$

(III) Sulfamerazine

The sulfamerazine may be recovered from the reaction mixture with the aid of acetic acid.

This process for manufacturing sulfamerazine has the disadvantage that there is present in the reaction mixture at the conclusion of the reaction a quantity of highly-colored materials. These colored materials apparently have similar solubility characteristics to the sulfamerazine, and it has therefore proven quite difficult to separate them from the sulfamerazine effectively by the methods heretofore available. The problem of removing the colored materials is particularly acute in view of the fact that the pharmaceutical grade of sulfamerazine is required to be substantially white. Also, since sulfamerazine is a relatively expensive chemical to manufacture, the losses of yield inherent in the conventional recovery and purification methods are of great economic significance.

It has now been discovered, unexpectedly, that if the reacted alcoholic mixture of sulfaguanidine, chlorovinylmethyl ketone, and sodium alcoholate is cooled to a suitable temperature, there is precipitated an alcohol-insoluble material containing the sodium salt of sulfamerazine, in an amount that represents virtually the entire ultimate yield of sulfamerazine, and such alcohol-insoluble portion is quite free of colored materials, especially after washing with a little alcohol, and can be dissolved almost entirely in water, further decolorized, and reprecipitated with acid in the form of a good grade of crude sulfamerazine in excellent yield.

The process is carried out by suspending the sulfaguanidine, which has previously been dried to a constant weight, to remove the one mole of water of crystallization which it usually contains, in an alcoholic solution of the alkali metal alcoholate, and adding the chlorovinylmethyl ketone gradually to the suspension, with agitation, in such manner as to permit a temperature rise from room temperature to about 50° C. It is preferred to employ in the reaction mixture slightly more than one mole of chlorovinylmethyl ketone for each mole of sulfaguanidine. A 10% or 15% molar excess of chlorovinylmethyl ketone produces a proportionate increase in the yield of sulfamerazine, based on the sulfaguanidine. The amount of sodium in the reaction mixture is preferably about two or three moles, per mole of sulfaguanidine.

After the addition of the chlorovinylmethyl ketone to the reaction mixture has been completed, stirring and heating of the mixture is preferably continued at a temperature of about 50° C., or at reflux temperature, for a period of several hours to bring the reaction substantially to completion.

In accordance with the invention, the completely reacted mixture is thereafter cooled to room temperature or somewhat below, say to a temperature within the range of from 0° to 20° C., to completely precipitate the material which is insoluble in the alcoholic medium at this temperature. The mixture is then filtered, and it is found that the solid material is of easily filterable crystalline structure and forms a good, firm filter cake, which is not highly colored. The filtrate, on the other hand, is highly colored, and apparently contains practically all of the colored impurities and by-products of the reaction. The filter cake may be washed with a small amount of alcohol, which comes through the cake with a very pale yellow color, and leaves the filter cake very nearly colorless.

The filter cake is then dissolved in water. If the reaction has been carried out in a medium comprising methanol the cake is completely soluble in water at room temperature, indicating that it contains no appreciable unreacted sulfaguanidine, and is comprised of the sodium salt of sulfamerazine in practically a pure state. The resulting aqueous solution may be further decolorized by adding a small amount of activated charcoal, together with 1% or so of sodium hydrosulfite, and heating on a steam bath at a temperature of about 80°–90° C. for a period of about one-half hour.

The solution is then filtered and cooled to about 20° C. It occasionally happens that a small amount of unreacted sulfaguanidine will precipitate at this point, in which case it should be filtered off. The cooled solution is then made slightly acid, conveniently with acetic acid. Sufficient acetic acid should be added to bring the pH of the solution below a value of 6, and addition of the acid should be discontinued when no more sulfamerazine is precipitated. The precipitated sulfamerazine may then be filtered off, and it is found that the resulting product has only a very slightly off-white color, and has a melting point only slightly below the melting point specified for pharmaceutical sulfamerazine.

The following examples will illustrate the invention in more detail, and may be read in conjunction with the accompanying drawing, which shows a flow diagram of the process of the invention.

*Example I*

| | Parts by weight |
|---|---|
| Sodium | 14 |
| Ethanol (commercial absolute) | 320 |
| Sulfaguanidine (0.2 mole) | 42.8 |
| Chlorovinylmethyl ketone (0.22 mole) | 23.0 |

The alcohol was placed in a vessel equipped with a heating and cooling jacket, an agitator, and a reflux condenser. The sodium was added gradually to the alcohol, and the resulting solution of sodium ethylate was cooled to about room temperature, after which the sulfaguanidine, which had previously been dried to a constant weight, was added. Dropwise addition of the chlorovinylmethyl ketone was then begun while stirring the mixture vigorously, over a period of ½ hour, during which time the temperature rose from about 26° to about 53° C.

The mixture was then heated for about 4 hours at 78° C., with continued stirring. The mixture was then cooled to about 20° C. The resulting crystalline precipitate was filtered off, washed with a small amount of alcohol, and dissolved in water. About 5% of decolorizing charcoal and 1% of sodium hydrosulfite were then added and the aqueous solution was heated on a steam bath at a temperature of about 80° C. for about ½ hour. The aqueous solution was then filtered and cooled, and sufficient acetic acid was added to precipitate the sulfamerazine. The yield was 38.3 parts of sulfamerazine, or about 78% based on the sulfaguanidine reacted, and about 66% based on chlorovinylmethyl ketone. The melting point of the product was 234–237° C. The alcoholic filtrate from the initial filtration was distilled to remove the alcohol, leaving a residue containing the unreacted sulfaguanidine, and other impurities and by-products. The still residue was taken up in hot water, and then cooled to precipitate the sulfaguanidine which was filtered off and dried. 2.8 parts of unreacted sulfaguanidine were recovered in this manner. The aqueous filtrate was then acidified with acetic acid, but no significant amount of sulfamerazine precipitated, indicating that substantially all of the recoverable sulfamerazine had already been obtained.

*Example II*

| | Parts by weight |
|---|---|
| Methanol | 470 |
| Sodium | 21.7 |
| Sulfaguanidine | 64.2 |
| Chlorovinylmethyl ketone | 35.9 |

The sodium was added to the methanol in a jacketed glass vessel provided with an agitator and reflux condenser. The temperature was maintained at about 58–60° C. during the addition, which required about ¾ of an hour. The reaction mixture was then cooled to about 20° C., and the sulfaguanidine was added to the resulting sodium methylate in methanol.

The chlorovinylmethyl ketone was then added gradually to the reaction mixture over a period of 15 minutes, during which time the temperature rose from an initial value of 20° C. to a final value of 45° C. The reaction mixture was then heated further to a temperature of 50° C., and maintained at such temperature for about 2 hours, followed by heating at 66–67° C. for a period of 3 hours. The mixture was then cooled to 20° C., washed, and filtered, yielding a crude sulfamerazine that contained a certain amount of sodium chloride. The weight of this crude sulfamerazine was 92.1 parts.

The alcohol-soluble filtrate was placed in a glass distillation vessel provided with a condenser and receiver. The methanol was distilled off under a reduced pressure of about 125–150 mm. The still residue was then dissolved in 500 parts of water at a temperature of 80° C. The resulting solution was cooled to 20° C., and filtered. In this way there was recovered a quantity of sulfaguanidine having a dry weight of 7 parts. The filtrate was neutralized with 30 parts of acetic acid, and the sulfamerazine precipitated in this manner was recovered by filtration. The recovered sulfamerazine amounted to 1.1 parts.

The alcohol-insoluble portion, amounting to 92.1 parts, was placed in a glass vessel, and dissolved in 600 parts of water. 1.8 parts of decolorizing charcoal and 0.2 parts of sodium hydrosulfite were added, and the solution was heated at 70° C. for a period of ½ hour. The mixture was then filtered and cooled to 20° C. The purified sulfamerazine was precipitated by the addition of 25 parts of acetic acid. 61.9 parts of dried sulfamerazine, melting at 233–235° C., was collected. This purified material represented a yield of 87.5%, based on the sulfaguanidine consumed, or 68% based on the chlorovinylmethyl ketone employed. The small amount of crude sulfamerazine recovered from the alcoholic filtrate amounted to a yield of 2% based on the sulfaguanidine, or 1% based on the chlorovinylmethyl ketone. The total over-all yield was therefore about 89.5% based on sulfaguanidine, or 69% based on chlorovinylmethyl ketone.

From the foregoing it will be evident that the invention provides a convenient and efficient process for recovering sulfamerazine in a relatively pure and colorless state. By separating the alcohol-insoluble material at the conclusion of the reaction and processing this material to obtain the sulfamerazine, it is found possible not only to increase the yield substantially compared to the prior art processes, but it is also found that the final product has superior purity and is very nearly free from color, so that it is very easily purified to the desired pharmaceutical grade without extensive purification and without undue losses.

Having thus described our invention, what we claim and desire to protect by Letters Patent is:

A method of recovering sulfamerazine from an alcoholic reacted mixture of sulfaguanidine, chlorovinylmethyl ketone, and sodium alcoholate, said alcoholic reaction mixture containing difficultly removable highly colored impurities which ordinarily tend to contaminate the sulfamerazine, comprising in combination the steps of cooling the said alcoholic reacted mixture to precipitate an alcohol-insoluble material composed essentially of the sodium salt of sulfamerazine in a comparatively pure state free from the bulk of said highly colored impurities which remain in solution in the alcoholic mixture, separating the said alcohol-insoluble material from the said alcoholic reaction mixture containing the bulk of the said highly colored impurities in solution, dissolving the said alcohol-insoluble material in water, heating the resulting aqueous solution with decolorizing charcoal and sodium hydrosulfite, filtering the aqueous solution, cooling the aqueous solution to room temperature, adding acetic acid to the said aqueous solution to precipitate the sulfamerazine at a pH below 6, and separating the sulfamerazine.

References Cited in the file of this patent

UNITED STATES PATENTS

| Number | Name | Date |
|---|---|---|
| 2,410,793 | Winnek et al. | Nov. 5, 1946 |
| 2,417,939 | Kuh et al. | Mar. 25, 1947 |
| 2,435,002 | Hartmann et al. | Jan. 27, 1948 |
| 2,488,081 | Fluchaire et al. | Nov. 15, 1949 |

FOREIGN PATENTS

| Number | Country | Date |
|---|---|---|
| 555,865 | Great Britain | Sept. 10, 1943 |